US009082349B2

(12) United States Patent
Feng

(10) Patent No.: US 9,082,349 B2
(45) Date of Patent: Jul. 14, 2015

(54) MULTI-PRIMARY DISPLAY WITH ACTIVE BACKLIGHT

(75) Inventor: Xiao-Fan Feng, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 13/604,578

(22) Filed: Sep. 5, 2012

(65) Prior Publication Data
US 2013/0050293 A1 Feb. 28, 2013

Related U.S. Application Data

(63) Continuation-in-part of application No. 13/221,347, filed on Aug. 30, 2011.

(51) Int. Cl.
G02F 1/1335 (2006.01)
G09G 3/34 (2006.01)
G09G 3/36 (2006.01)

(52) U.S. Cl.
CPC ........ *G09G 3/3426* (2013.01); *G02F 1/133603* (2013.01); *G09G 3/3413* (2013.01); *G09G 3/3648* (2013.01); *G09G 2320/0242* (2013.01); *G09G 2320/0271* (2013.01);
(Continued)

(58) Field of Classification Search
CPC ...... Y02B 20/16; Y02B 20/18; Y02B 20/181; H05B 33/10; H05B 33/14; C09K 11/00; C09K 11/0833; G02F 1/133602; G02F 1/133603; G09G 3/3413; G09G 3/3648; G09G 3/3426; G09G 2320/0242; G09G 2320/0271; G09G 2320/0646; G09G 2340/06; G09G 2360/16

USPC .............. 345/87–104, 690, 589–593; 362/84, 362/551, 97.2, 97.3, 363, 231; 250/459.1; 349/68.69; 313/498, 503; 257/98; 359/583; 353/30
See application file for complete search history.

(56) References Cited

U.S. PATENT DOCUMENTS 6,633,302 B1  10/2003  Ohsawa et al.
6,795,455 B2 *  9/2004  Scheps .......................... 372/21
7,199,839 B2  4/2007  Kim
(Continued)

FOREIGN PATENT DOCUMENTS

JP  2007-206635 A  8/2007
JP  2007-322988 A  12/2007
JP  2009-265135 A  11/2009

OTHER PUBLICATIONS

International Search Report, mailed Oct. 2, 2012, PCT International Patent App. No. PCT/JP2012/066458, Sharp Kabushiki Kaisha.
(Continued)

Primary Examiner — Ariel Balaoing
Assistant Examiner — Darlene M Ritchie
(74) Attorney, Agent, or Firm — Chernoff Vilhauer McClung & Stenzel, LLP

(57) ABSTRACT

A method of illuminating a display includes spatially varying the luminance of a multi-colored light source illuminating a plurality of pixels of the display in response to receiving a plurality of pixel values, and varying the transmittance of a light valve of the display having filters corresponding to the multi-colored light source in response to receiving the plurality of pixel values. The illumination is modified for a plurality of pixel values based upon modification of the luminance of the light source and varying the transmittance of the light valve.

7 Claims, 16 Drawing Sheets

(52) U.S. Cl.
CPC ... *G09G 2320/0646* (2013.01); *G09G 2340/06* (2013.01); *G09G 2360/16* (2013.01)

(56) References Cited

U.S. PATENT DOCUMENTS

| | | | |
|---|---|---|---|
| 7,592,996 B2 | 9/2009 | Brown Elliott et al. | |
| 7,709,811 B2* | 5/2010 | Conner | 250/459.1 |
| 7,714,824 B2 | 5/2010 | Roth | |
| 7,868,341 B2* | 1/2011 | Diana et al. | 257/98 |
| 8,684,559 B2* | 4/2014 | Van De Ven et al. | 362/293 |
| 2004/0056990 A1* | 3/2004 | Setlur et al. | 349/69 |
| 2005/0046334 A1* | 3/2005 | Fujiwara | 313/498 |
| 2006/0171152 A1 | 8/2006 | Suehiro et al. | |
| 2006/0255710 A1* | 11/2006 | Mueller-Mach et al. | 313/485 |
| 2008/0043303 A1* | 2/2008 | Whitehead et al. | 359/19 |
| 2008/0191229 A1* | 8/2008 | Kim et al. | 257/98 |
| 2008/0204479 A1 | 8/2008 | Seetzen | |
| 2009/0009995 A1* | 1/2009 | Grasser et al. | 362/231 |
| 2009/0045422 A1* | 2/2009 | Kato et al. | 257/98 |
| 2009/0116215 A1* | 5/2009 | Falicoff et al. | 362/84 |
| 2009/0174638 A1* | 7/2009 | Brown Elliott et al. | 345/88 |
| 2009/0251783 A1* | 10/2009 | Huibers et al. | 359/583 |
| 2010/0142189 A1* | 6/2010 | Hong et al. | 362/97.3 |
| 2010/0214282 A1* | 8/2010 | Whitehead et al. | 345/214 |
| 2010/0214311 A1* | 8/2010 | Roth | 345/590 |
| 2010/0277673 A1* | 11/2010 | Hoelen et al. | 349/68 |
| 2010/0328537 A1* | 12/2010 | Davies et al. | 348/674 |
| 2011/0038150 A1* | 2/2011 | Woodgate et al. | 362/235 |
| 2011/0043101 A1* | 2/2011 | Masuda et al. | 313/503 |
| 2011/0175518 A1* | 7/2011 | Reed et al. | 313/483 |
| 2011/0235309 A1* | 9/2011 | Miki et al. | 362/97.2 |
| 2011/0273495 A1 | 11/2011 | Ward et al. | |
| 2011/0285681 A1 | 11/2011 | Kondoh et al. | |
| 2011/0298696 A1* | 12/2011 | Gu et al. | 345/102 |
| 2012/0170002 A1* | 7/2012 | Ouderkirk et al. | 353/30 |
| 2012/0287147 A1* | 11/2012 | Brown Elliott et al. | 345/593 |
| 2012/0298953 A1* | 11/2012 | Sim | 257/13 |
| 2013/0270587 A1* | 10/2013 | Ouderkirk et al. | 257/89 |

OTHER PUBLICATIONS

Kazunari Tomizawa et al., "P-69: Beyond RGB-Primaries: Chromaticity Measurement Issues for Multi-Primary Displays," SID Digest, 2010, 4 pgs.
International Search Report and Written Opinion, PCT/JP2013/004427, filed Jul. 19, 2007, Sharp Kabushiki Kaisha, dated Sep. 24, 2013, 4 pgs.

* cited by examiner

FIG. 1 HDR DISPLAY WITH LED BACKLIGHT

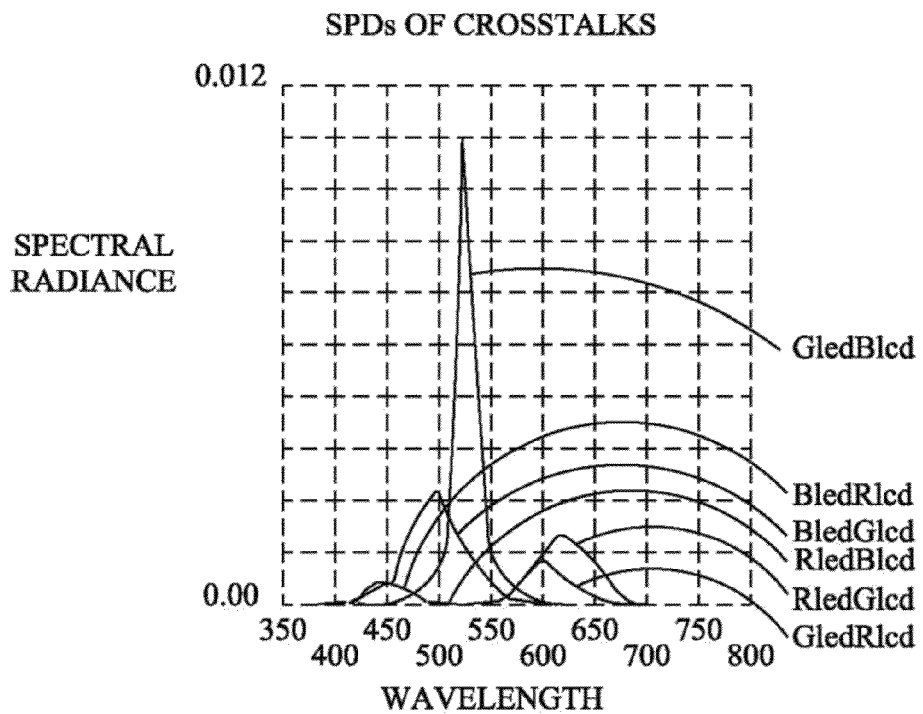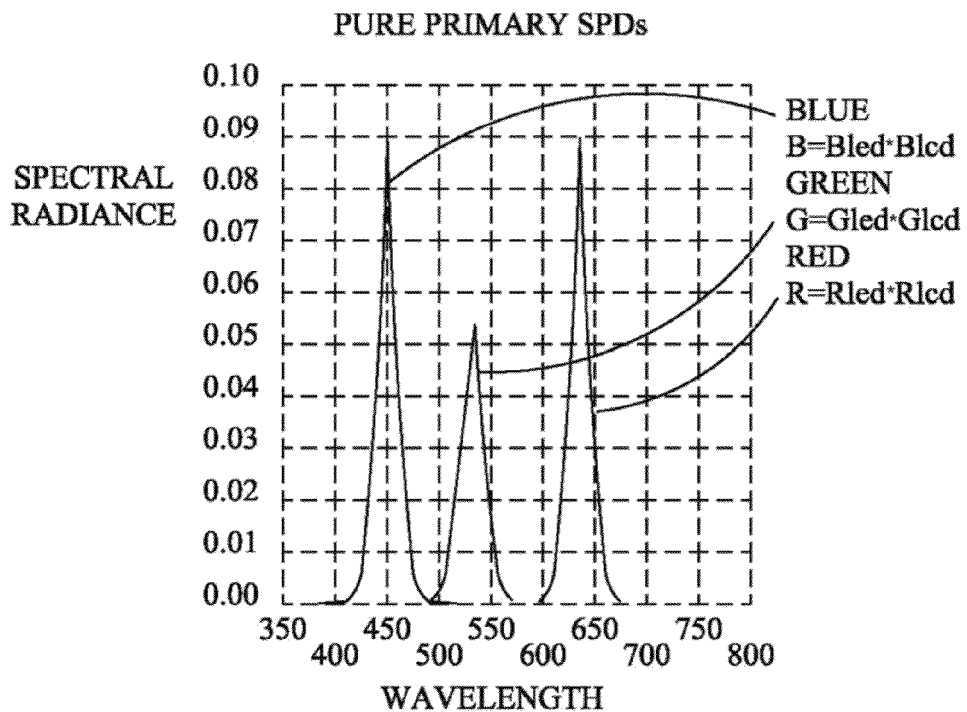
FIG. 2

FIG. 3 COLOR GAMUT

FIG. 4 CHROMATICITY DIAGRAM OF ACTIVE AREA RGB LED BACKLIGHT DISPLAY

FIG 5. COLOR DIFFERENCE HISTOGRAM

FIG. 6 RENDERING RGBC TO $RGB_{LED}$ AND $RGB_{LCD}$

US 9,082,349 B2

MULTI-PRIMARY DISPLAY WITH ACTIVE BACKLIGHT

CROSS-REFERENCE TO RELATED APPLICATIONS

This application is a continuation-in-part of U.S. patent application Ser. No. 13/221,347, filed Aug. 30, 2011.

BACKGROUND OF THE INVENTION

The present invention relates to backlit displays and, more particularly, to a backlit display with improved color.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transits of the panel and images displayed on this type of panel may be difficult to see except under the best lighting conditions. On the other hand, LCD panels used for computer displays and video screens are typically backlit with fluorescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

Unfortunately, the color gamut of a display with three primary color elements is sufficiently limited to result in insufficient colors to render a natural scene.

BRIEF DESCRIPTION OF THE SEVERAL VIEWS OF THE DRAWINGS

FIG. 2 illustrates the spectra of a display with RGB LED and RGB LCD.

DETAILED DESCRIPTION OF PREFERRED EMBODIMENT

Figure 1:
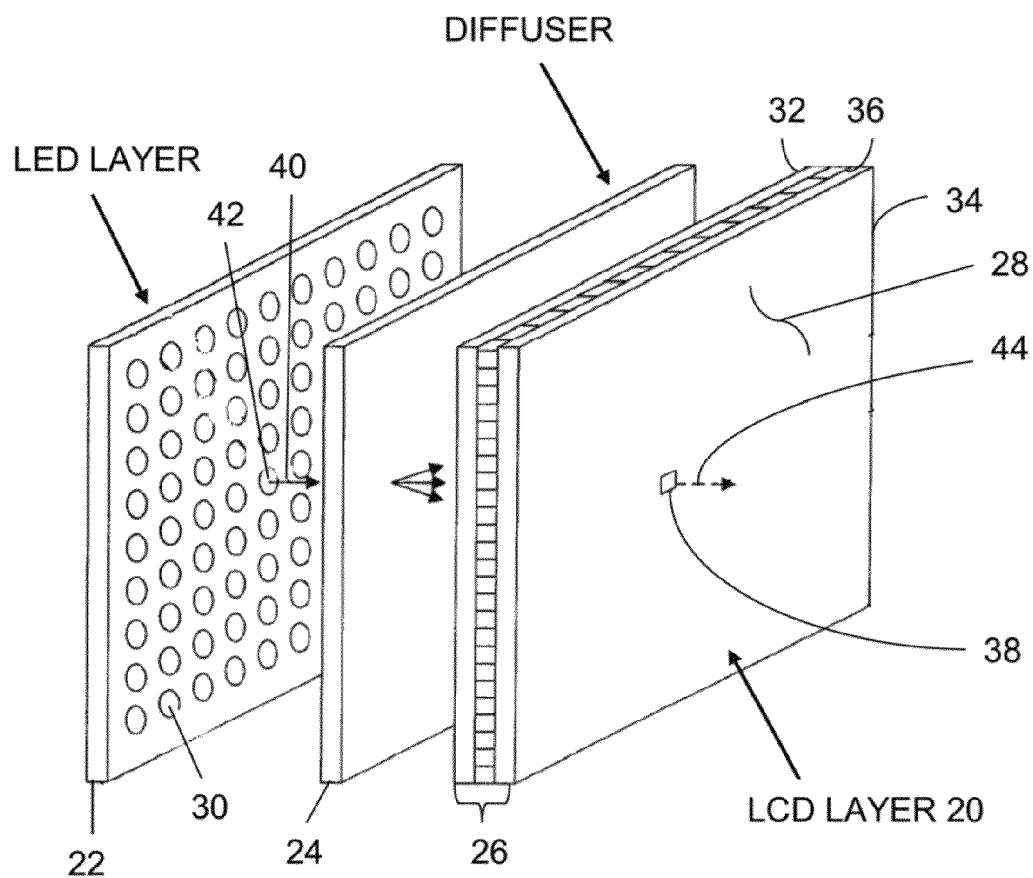
FIG. 1 illustrates a display with a backlight.

Referring to FIG. 1, a backlit display 20 comprises, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The backlight 22 comprises fluorescent light tubes or an array of light sources 30 (e.g., light-emitting diodes (LEDs)), as illustrated in FIG. 1, and/or edge based illumination sources, is necessary to produce pixels of sufficient intensity for highly visible images or to illuminate the display in poor lighting conditions. There may not be a light source 30 for each pixel of the display and, therefore, the light from the point or line sources is typically dispersed by a diffuser panel 24 so that the lighting of the front surface of the panel 28 is more uniform.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each succeeding molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 38 at the front surface of the display 28.

To darken the pixel 38, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 38 progressively darkens until the maximum extinction of light 40 from the light source 42 is obtained. Color LCD displays are created by varying the intensity of transmitted light for each of a plurality of primary color elements (typically, red, green, and blue) making up a display pixel.

Conventional red-blue-green light sources, and the associated color gamut resulting from each of these primaries does not cover all color gamut of the natural world in a sufficient manner, especially in yellow and cyan regions of the color gamut. One technique to increase the color gamut of the display is to include additional light sources with additional different colors. For example, a cyan primary and yellow primary light source may be included, together with appropriate color filters, to increase the color gamut of the display. Unfortunately, the increase in the color gamut of the display as a result of additional primaries may require the use of additional expensive color filter masks, increases the complexity of the display, and reduces the aperture ratio of the display as the result of the additional sub-pixels.

To increase the effective color gamut of the display, the crosstalk between selected colors of the backlight in combination with different corresponding filter colors may be expressly included in the determination of the state of the backlight and/or liquid crystal layer, as opposed to being expressly or implicitly ignored, in a manner to suitably display an image on the display. As previously described, FIG. 1 illustrates a display with a light emitting diode layer used as a backlight for the liquid crystal material. The light from the array of LEDs passes through the diffusion layer and illuminates the LCD. The backlight image may be characterized as $$bl(x,y) = LED(i,j) * psf(x,y) \quad \text{(Equation 1)}$$

where $LED(i,j)$ is the LED output level of each LED, and $psf(x,y)$ is the point spread function of the diffusion layer, where $*$ denotes convolution operation. The backlight image is further modulated by the liquid crystal layer.

The displayed image is the product of the LED backlight $LED(i,j)$ and the transmittance of the LCD array, referred to as $LCD(x,y)$.

$$img(x,y) = bl(x,y)LCD(x,y) = (LED(i,j)*psf(x,y))LCD(x,y) \quad \text{(Equation 2)}.$$

By combining the outputs of the LED and LCD arrays, the dynamic range of display is the product of the dynamic range of the LED and LCD arrays. For simplicity, one may normalize the LCD and LED outputs, respectively, to between 0 and 1. The use of red blue green (or other tri-color spectrum of a suitable type of light sources) LEDs further improves the display in terms of the potential color gamut and possible power savings. For an example, if only the red color is displayed, both the green and blue LEDs can be off, which reduces both the power consumption and the leakage from green and blue light sources which lead to a pure color even at lower intensity. The same occurs for the other light sources. The display image may be represented as a function of wavelength $\lambda$ and characterized as:

$$img(x,y,\lambda) = bl(x,y,\lambda)LCD(x,y,\lambda) \quad \text{(Equation 3)},$$

where $$bl(x,y,\lambda) = (LED_r(i,j,\lambda) + LED_g(i,j,\lambda) + LED_b(i,j,\lambda)) * psf(x,y)$$

$$T_{LCD}(x,y,\lambda) = LCD_r(x,y,\lambda) + LCD_g(x,y,\lambda) + LCD_b(x,y,\lambda).$$

The products of RGB LED backlight and RGB LCD arrays form nine distinct spectra, three primary spectra and six secondary spectra as shown in FIG. 2. The secondary spectra is the result of a backlight color (e.g., green backlight) passing through a color filter other than the color filter corresponding to the particular backlight color (e.g., not the green filter). In this manner, the spectra of one backlight light source is filtered by a filter for a different backlight light source, to provide a secondary spectra. Of the six secondary spectra, it turns out that the spectrum from the green LEDs to the blue LCDs is filtered by a considerably larger amount than the other secondary spectra, with the other secondary spectra being relatively small in comparison. To reduce the computational requirements the other secondary spectra may be ignored. The use of three primary colors, together with an additional secondary spectra, only moderately increases the computational complexity of the system, while providing a substantially increased color gamut, and not requiring substantial increase in complexity associated with additional color filters or reduced sub-pixel apertures. Alternatively, the technique may incorporate one or more additional secondary spectra, as desired.

The resulting four primary spectra, including the crosstalk from the combination of the green LED together with the blue LCD filter, can be modeled as:

$$\begin{pmatrix} R \\ G \\ B \\ C \end{pmatrix} = \begin{bmatrix} LED_r & 0 & 0 \\ 0 & LED_g & 0 \\ 0 & 0 & LED_b \\ 0 & 0 & LED_g \end{bmatrix} \begin{bmatrix} LCD_r \\ LCD_g \\ LCD_b \end{bmatrix} \quad \text{Equation 4}$$

Figure 3:
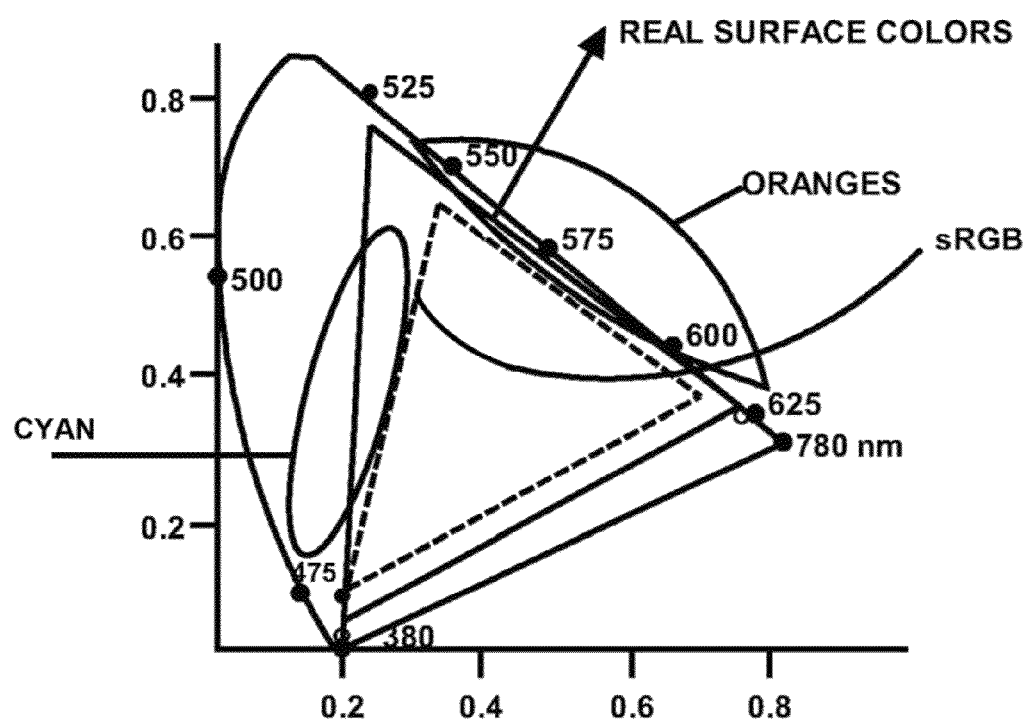
FIG. 3 illustrates a chromaticity diagram of a display with RGB primary.

Both the LED and the LCD voltages can be independently modulated. Since the LED array has a much lower resolution, the LED intensity values in Equation 4 are given by the convolution of the LED driving signal and the point spread function (PSF) of the LED. By utilizing the fourth crosstalk primary, the system may achieve a larger color gamut which as a result displays more real colors in the world, especially in the dark cyan area, as shown in FIG. 3.

The colorimetric model of the system may include a forward model that accepts RGBC input coordinates and predicts the output color tri-stimulus values XYZ (i.e., CIE color coordinates) produced by the system using a 3×4 matrix with dark correction.

$$XYZ = \begin{bmatrix} X_R, X_G, X_B, X_C \\ Y_R, Y_G, Y_B, Y_C \\ Z_R, Z_G, Z_B, Z_C \end{bmatrix} * \begin{bmatrix} R \\ G \\ B \\ C \end{bmatrix} \quad \text{Equation 5}$$

Where X, Y and Z are dark corrected tri-stimulus values and the subscripts R, G, B and C represent for full red, full green, full blue, and the selected crosstalk.

The colorimetric model may include an inverse model that uses a single-pass technique to construct the inverse model, which turns an undetermined 3×4 inverse problem to several determined 3×3 transformations.

Figure 4:
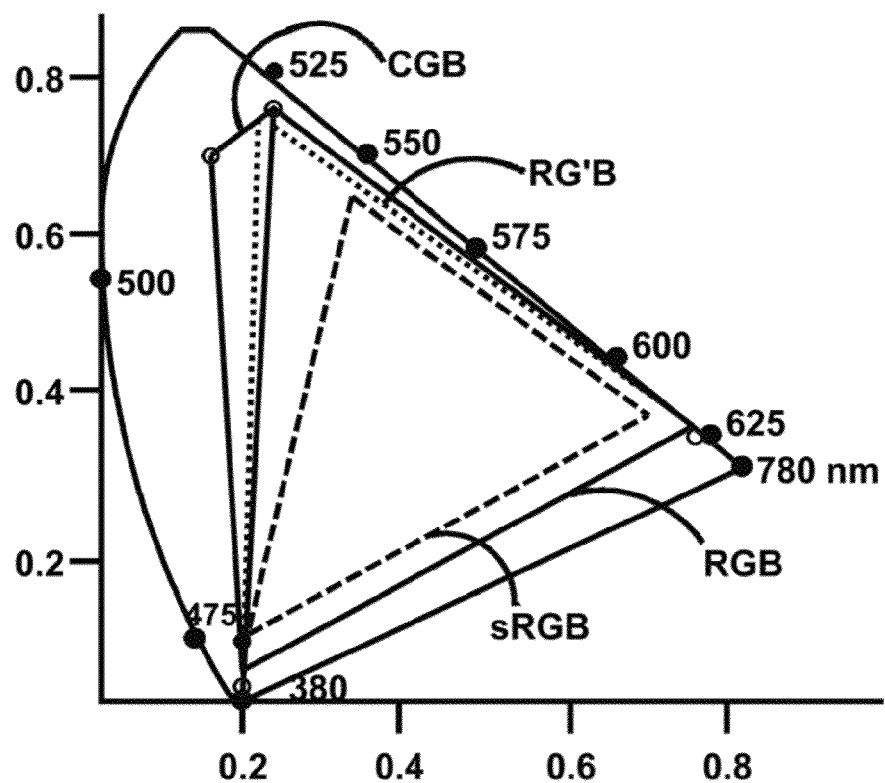
FIG. 4 illustrates a chromaticity diagram of a display with RGBC primary.

First, since the luminance gain is of importance to the rendered image quality, in order to utilize the luminance gain, the system may first determine whether the input falls inside RG'B (G' is combined primary of G and C, as is shown in FIG. 4 and calculated in Equation (6)) gamut or not, shown in Equation (7). If $RGB_1$ scalars are in the range of [0, 1], it means that the input is inside RG'B, and then RGB and C values may be directly calculated.

$$G' = G + C \quad \text{Equation 6}$$

$$RGB_1 = inv\left(\begin{bmatrix} X_R, X_G + X_C, X_B \\ Y_R, Y_G + Y_C, Y_B \\ Z_R, Z_G + Z_C, Z_B \end{bmatrix}\right) * XYZ \quad \text{Equation 7}$$

$$RGB = RG'B_1, C = G' \quad \text{Equation 8}$$

Second, if the color does not fall into the RG'B color gamut, then the system may determine whether the input is inside RGB color gamut or not. Similarly, if $RGB_2$ are within the range of [0, 1], then the input are inside the RGB color gamut (i.e., no crosstalk is necessary, if desired) and the RGBC may be calculated directly as illustrated in Equation (10).

$$RGB = inv\left(\begin{bmatrix} X_R, X_G + X_C, X_B \\ Y_R, Y_G + Y_C, Y_B \\ Z_R, Z_G + Z_C, Z_B \end{bmatrix}\right) * XYZ \quad \text{Equation 9}$$

$$RGB_2 = inv\left(\begin{bmatrix} X_R, X_G, X_B \\ Y_R, Y_G, Y_B \\ Z_R, Z_G, Z_B \end{bmatrix}\right) * XYZ$$

$$RGB = RGB_2, C = 0 \quad \text{Equation 10}$$

Third, if the input does not fall inside the RG'B or the RGB color gamut, then it falls into CGB color gamut and the system may use a single pass method to estimate suitable RGBC values. Initially, the system may calculate tri-stimulus value differences introduced by C, as shown in Equation 11 and Equation 12 (dXYZ may be considered a residual). Then GBC may be calculated by inverse matrix of GBC and then it is added back to RGB to determine RGBC values, as shown in Equation 13 and Equation 14. Also, if any of the values are out of range (e.g., greater than 1 or less than zero), they may be clipped back to 1 or 0 so they are at a boundary.

$$RGB_{tmp} = inv\left(\begin{bmatrix} X_R, X_G + X_C, X_B \\ Y_R, Y_G + Y_C, Y_B \\ Z_R, Z_G + Z_C, Z_B \end{bmatrix}\right) * XYZ \quad \text{Equation 11}$$

$$dXYZ = XYZ - \begin{bmatrix} X_R, X_G, X_B \\ Y_R, Y_G, Y_B \\ Z_R, Z_G, Z_B \end{bmatrix} * \min(1, \max(0, RGB_{tmp})) \quad \text{Equation 12}$$

$$GBC = inv\left(\begin{bmatrix} X_G, X_B, X_C \\ Y_G, Y_B, Y_C \\ Z_G, Z_B, Z_C \end{bmatrix}\right) * dXYZ \quad \text{Equation 13}$$

$$\begin{bmatrix} R \\ G \\ B \\ C \end{bmatrix} = \begin{bmatrix} RGB_{tmp}(1,:) \\ RGB_{tmp}(2,:) + GBC(1,:) \\ RGB_{tmp}(3,:) + GBC(2,:) \\ GBC(3,:) \end{bmatrix} \quad \text{Equation 14}$$

Accordingly, the system has the ability to differentiate between multiple different characteristics of the input values to provide better selection of appropriate color values and crosstalk values, if any.

Figure 5:
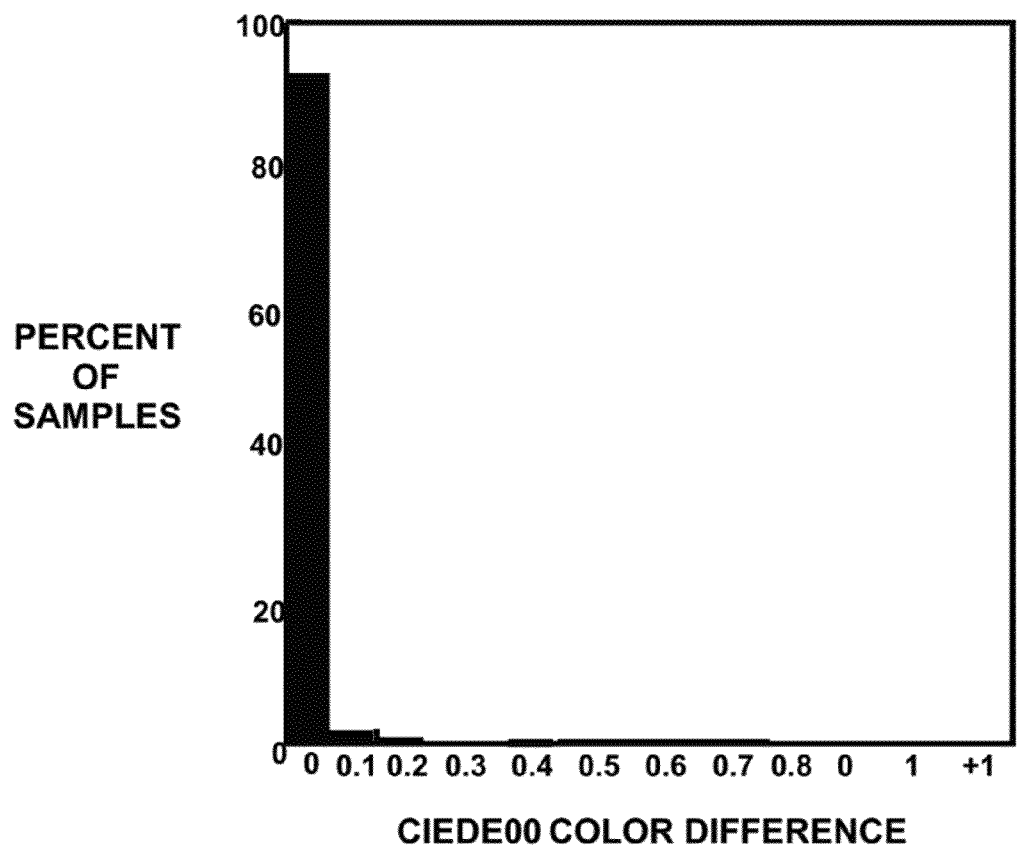
FIG. 5 illustrates a color difference histogram.

In order to evaluate the performance of the reverse model, the RGBC scalar may be sampled at 0.25 intervals (altogether 625 groups of data) to be used as input RGBC. Its corresponding XYZ and Lab values are calculated accordingly. Then the inverse model is applied to transform XYZ to RGBC. After this, the X'Y'Z' and L'a'b' may be calculated and a color difference metric may be used to evaluate the difference between the input and the output predicted by the inverse model. The result is plotted in FIG. 5 and listed in Table 1.

TABLE 1

| Color Difference Evaluation | | | | |
|---|---|---|---|---|
| | Mean | Min | Max | Std. |
| CIEDE2000 | 0.016 | 0 | 0.72 | 0.08 |

Figure 6:
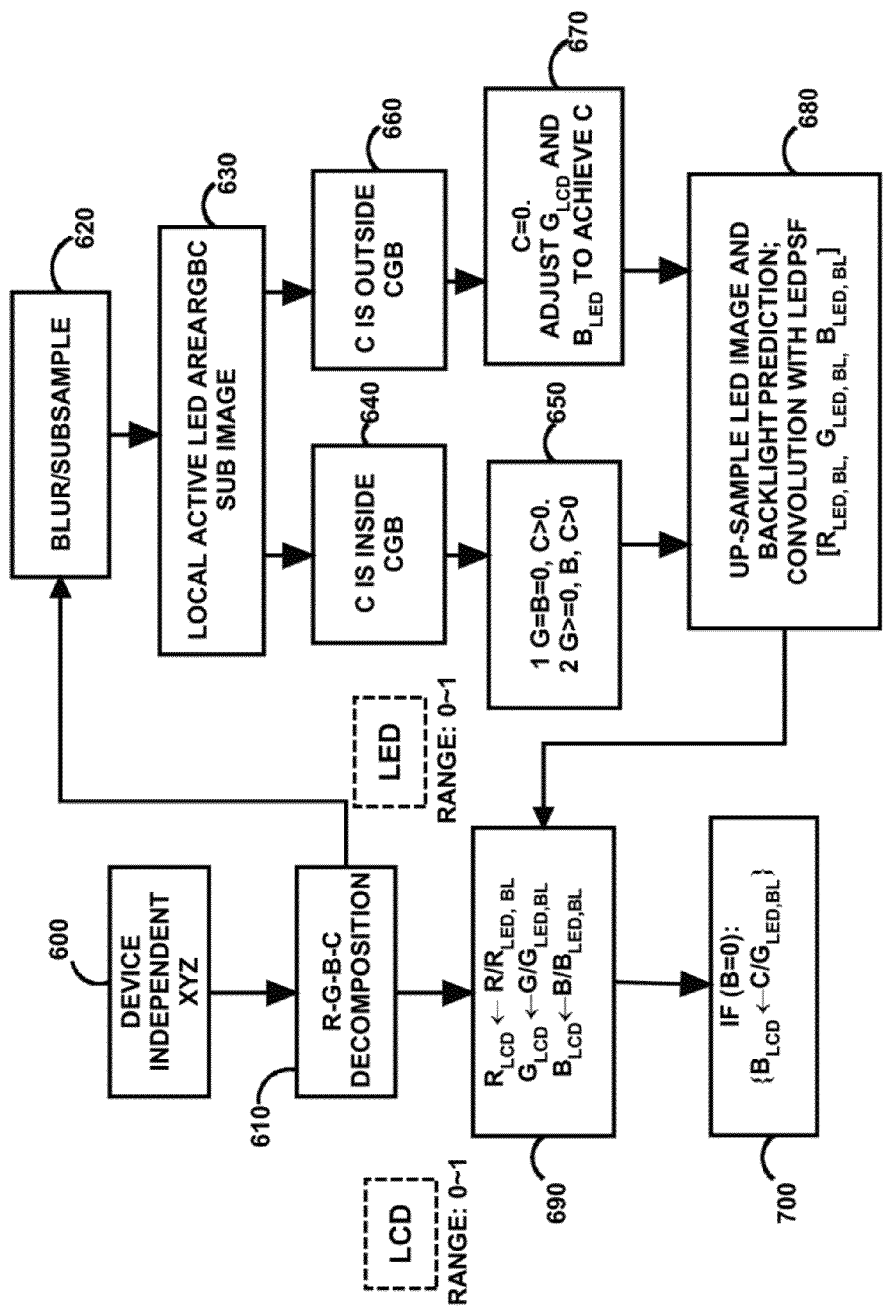
FIG. 6 illustrates rendering RGBC to $RGB_{LED}$ and $RGB_{LCD}$.

To render RGBC to $RGB_{LED}$ and $RGB_{LCD}$ since C is a dependent crosstalk primary, the system does not have independent control of C. In order to achieve a suitable C, the system has four degrees of freedoms, which are $G_{LED}$, $G_{LCD}$, $B_{LED}$ and $B_{LCD}$. A suitable rendering technique is illustrates in FIG. 6.

A set of device independent set of values (i.e., X, Y, Z) 600 representative of an image to be displayed are converted to a RGBC image 610. Preferably, the conversion to the image 610 is performed by using Equation 14.

The backlight values are selected so that suitable crosstalk will be provided, as desired. The image 610 is sub-sampled 620 to the LED resolution, which is typically lower in resolution. The result of the sub-sampling is an image representative of the spatial distribution of the backlight 630. There exist special cases that may be accounted for, if desired. The first set of special cases is when C is inside the region defined by CGB 640. For this special case 650, defined in table 2 rows 1 and 2 where $B_{LED}$ is zero, the essence is to use the $B_{LCD}$ for the cross talk term since the $B_{LED}$ is zero. Otherwise, table 2 row 3 is used.

The second set of special cases 660, defined in table 2 row 4 and 5, is when C is outside the region defined by CGB, but within the RGB gamut. The green and blue LEDs, i.e., $G_{LED}$ and $B_{LED}$, are adjusted 670 accordingly.

In either case, the LED image is up-sampled 680 to LCD resolution, thereafter, the LCD image 690 may be determined by division between input R, G, B 610 and $R_{LED,BL}$, $G_{LED,BL}$ and $B_{LED,BL}$ 680. If B=0 and C>0, then $B_{LCD}$ may be adjusted 700.

TABLE II

Techniques To Determine C Under Different Cases

C is inside CGB color gamut

|  | At LED resolution | At LCD resolution |
|---|---|---|
| G = B = 0, C > 0 | $G_{LED}$ = sub Im g2BL($C_{img}$) | $B_{LCD}$ = $C_{img}/G_{LED}$ |
| B = 0, G, C > 0 | $RGB_{LED}$ = sub Im g2BL($RGB_{img}$) | $B_{LCD}$ = $C_{img}/G_{LED}$ |
| G ≥ 0, B, C > 0 | $RGB_{LED}$ = sub Im g2BL($RGB_{img}$), $B_{LCD}$ = B/$B_{LED}$, $G_{LED}$ = $C_{img}/B_{LCD}$. When $G_{LED}$ > 1, need to change $B_{LED}$ as well: $G_{LED}$ = 1, so $B_{LCD}$ = C, $B_{LED}$ = B/$B_{LCD}$. | $RGB_{LCD}$ = $RGB_{img}/RGB_{LED}$ |

C is outside CGB color gamut

| At LED resolution | $B_{LED}$ = $B_{LED}$ + psf * (0.25 + 0.5 * $B_{LED}$) |
|---|---|
| At LCD resolution | $G_{LCD}$ = min(1, max(0, $G_{LCD}$ - LCDLED.gLED2bLCD * ($B_{LCD}$ - $G_{LCD}$))) |

Figure 7:
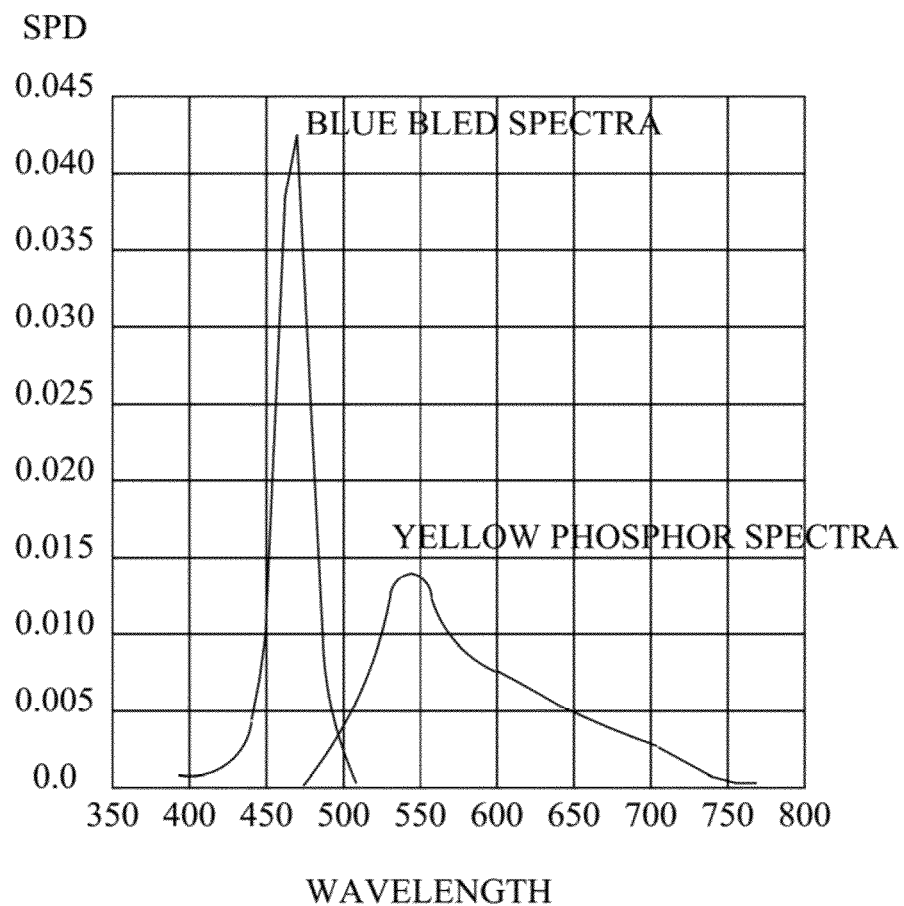
FIG. 7 illustrates the spectra of a dual LED backlight with blue and yellow.

For some displays, it is desirable to include a generally yellow spectrum in order to increase the color gamut of the display. The yellow spectrum may be provided from a blue light emitting diode by using a conversion of a generally blue spectrum to a generally yellow spectrum using a Stokes shift, or other suitable mechanism. Referring to FIG. 7, an exemplary such conversion from generally blue to generally yellow is illustrated. As it may be observed, the resulting color spectrum includes a substantially greater amount of yellow. In this case, the resulting display will typically have multiple primary colors plus a yellow primary, such as red, blue, green, yellow.

Figure 8:
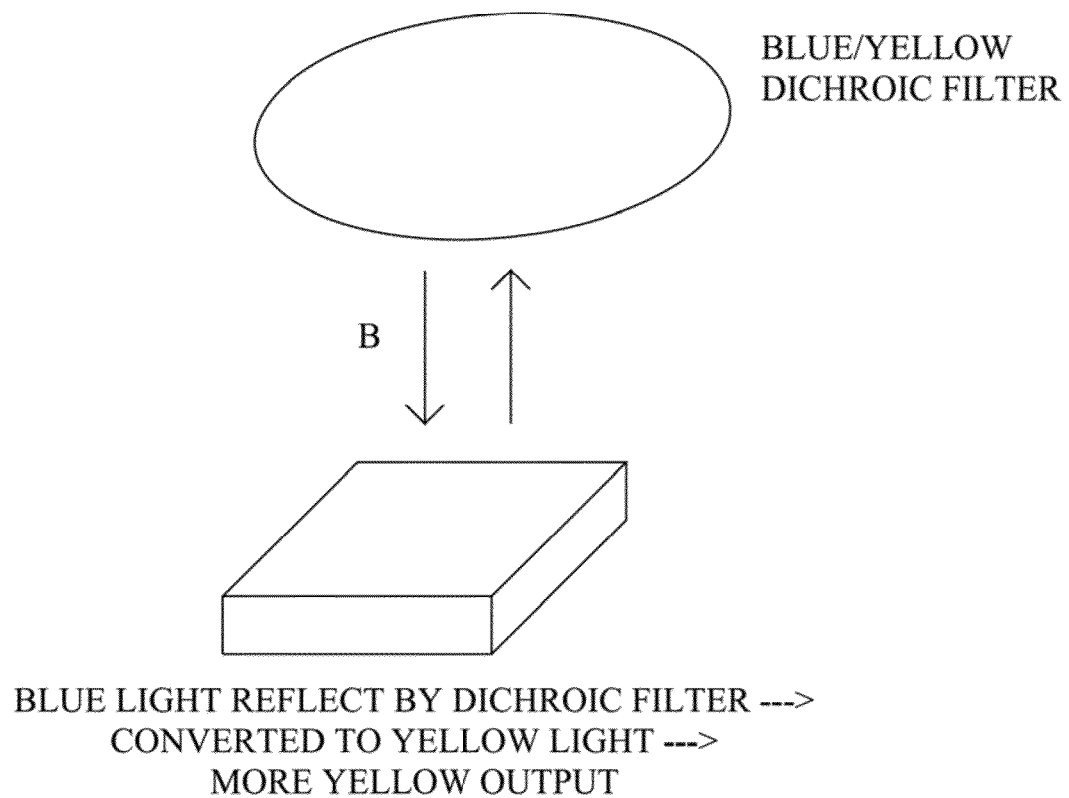
FIG. 8 illustrates a yellow LED from a normally white LED.

Referring to FIG. 8, a technique to achieve additional yellow spectrum for the display includes using a selective filter, such as a blue/yellow dichroic filter. Light emitting from a light source, such a blue light emitting diode, partially undergoes a conversion to a generally yellow spectrum. The generally yellow spectrum light passes through the blue yellow dichroic filter. The blue light from the light emitting diode is reflected by the blue yellow dichroic filter. At least part of the reflected blue light from the dichroic filter is again converted by the phosphor to a generally yellow spectrum. The reflected converted light from the blue to yellow phosphor passes through the blue yellow dichroic filter. This reflection and conversion process may continue. In this manner, the luminous output of the yellow may be increased. The backlight now comprises two colors, blue light from the blue LEDs and yellow light from the blue LEDs via the blue-to-yellow phosphor.

The display image as a function of wavelength ($\lambda$), with yellow included in the display image, may be given by $$img(x,y,\lambda)=bl(x,y,\lambda)LCD(x,y,\lambda)$$

where $$bl(x,y,\lambda)=(LED_b(i,j,\lambda)+LED_y(i,j,\lambda))*psf(x,y)$$

$$T_{LCD}(x,y,\lambda)=LCD_r(x,y,\lambda)+LCD_g(x,y,\lambda)+LCD_b(x,y,\lambda)+LCD_y(x,y,\lambda)$$

Figure 9:
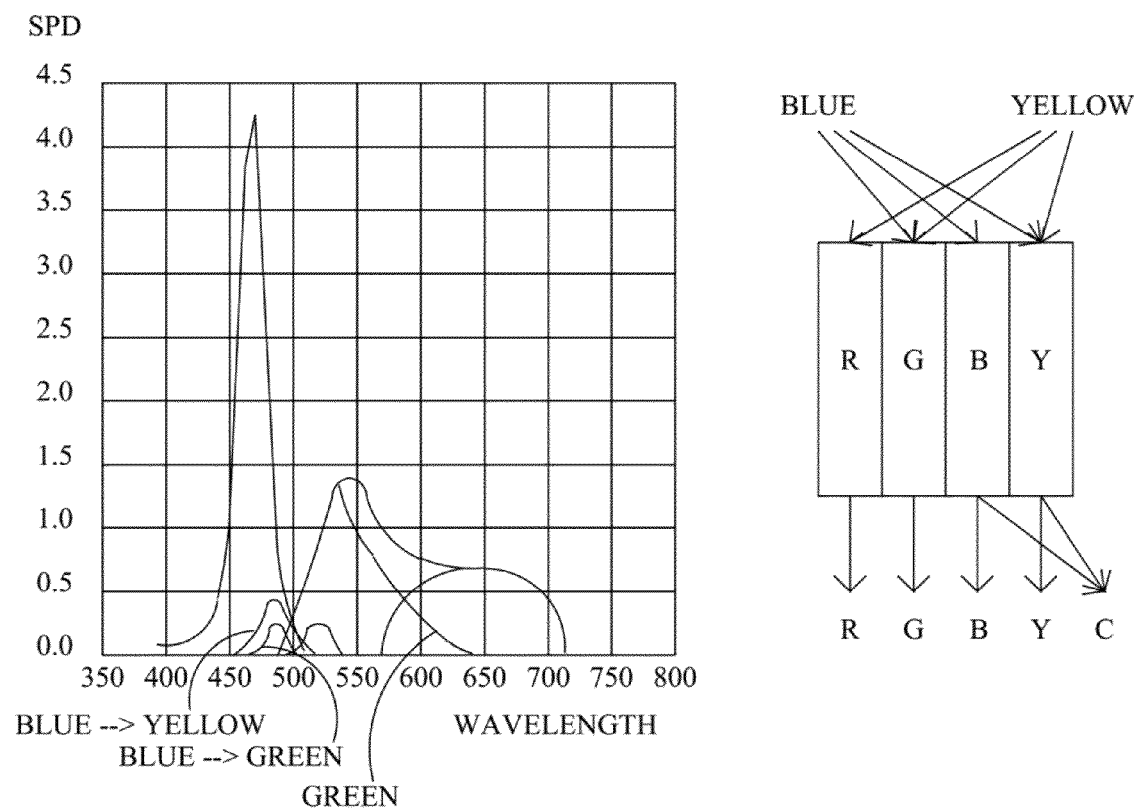
FIG. 9 illustrates a spectra of a display with dual LED and RGB LCD.

Referring to FIG. 9, the products of a dual LED backlight and RGBY LCD form eight distinct spectra, four primary spectra and four secondary spectra. Additional backlight spectrum may be used, as desired. Additional LCD filters may be used, as desired. Of the four secondary spectra, the blue LED to yellow and green LCD sub-pixels are quite significant at the cyan spectrum. A crosstalk based color, using the yellow spectrum, may be used as an additional primary in the display, such as a fifth primary in a RGBYC display.

Figure 10:
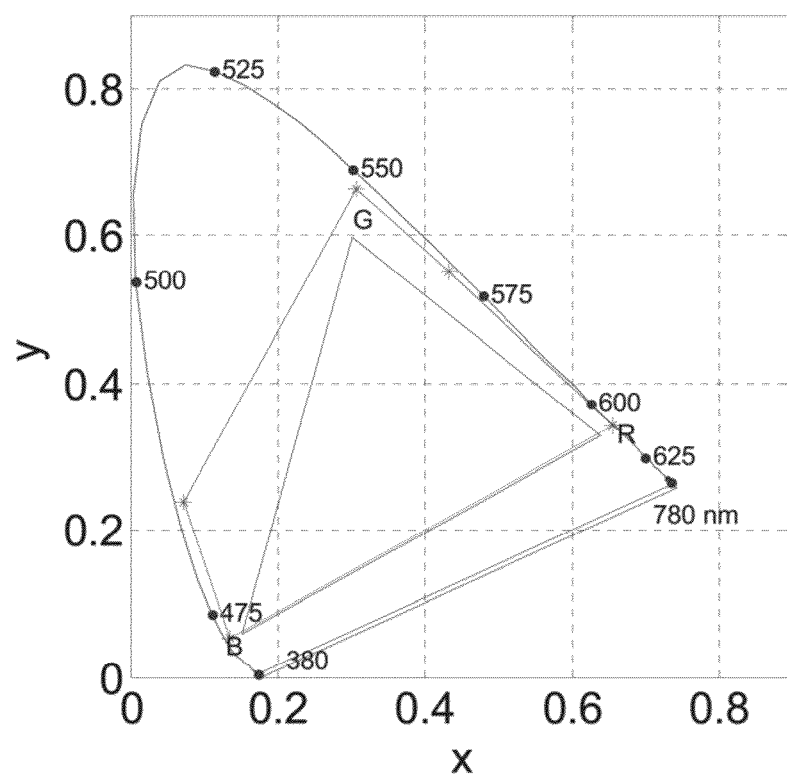
FIG. 10 illustrates a color gamut of a RGBYC primary display.

Referring to FIG. 10, the five primaries can be modeled as:

$$\begin{pmatrix} R \\ G \\ B \\ Y \\ C \end{pmatrix} = \begin{bmatrix} LED_y & 0 & 0 & 0 \\ 0 & LED_y & 0 & 0 \\ 0 & 0 & LED_b & 0 \\ 0 & 0 & 0 & LED_y \\ 0 & LED_b & 0 & LED_b \end{bmatrix} \begin{bmatrix} LCD_r \\ LCD_g \\ LCD_b \\ LCD_y \end{bmatrix}$$

where both LED and LCD values may be independently modulated. Since the LED is at much lower resolution, the LED values in the above equation may be given by the convolution of LED driving signal and the point spread function (PSF) of LED.

By utilizing the crosstalk primary, the system may achieve a larger color gamut which facilitates the display of more real colors in the world, especially in the dark cyan region.

The colorimetric model of the system may include RGBYC input coordinates and predict the output color tristimulus values XYZ produced by the display system using a 3×5 matrix illustrated below.

$$\begin{pmatrix} X \\ Y \\ Z \end{pmatrix} = \begin{bmatrix} X_r & X_g & X_b & X_y & X_c \\ Y_r & Y_g & Y_b & Y_y & Y_c \\ Z_r & Z_g & Z_b & Z_y & Z_c \end{bmatrix} \begin{bmatrix} R \\ G \\ B \\ Y \\ C \end{bmatrix}$$

$X_S$, $Y_S$ and $Z_S$ are tristimulus values and the subscripts r, g, b, y and c represent the red, green, blue, yellow, and crosstalk cyan. It is noted that the C primary may be a crosstalk primary with a much lower spatial resolution than the other primaries.

If the color is out of the RGBY color gamut (one of the color is either less than 0, or greater than 1), then it may clipped the color to RGBY gamut, and render the residue XYZ in GBC triangle.

$$GBC = inv\left(\begin{bmatrix} X_G, X_B, X_C \\ Y_G, Y_B, Y_C \\ Z_G, Z_B, Z_C \end{bmatrix}\right) * dXYZ$$

Figure 11:
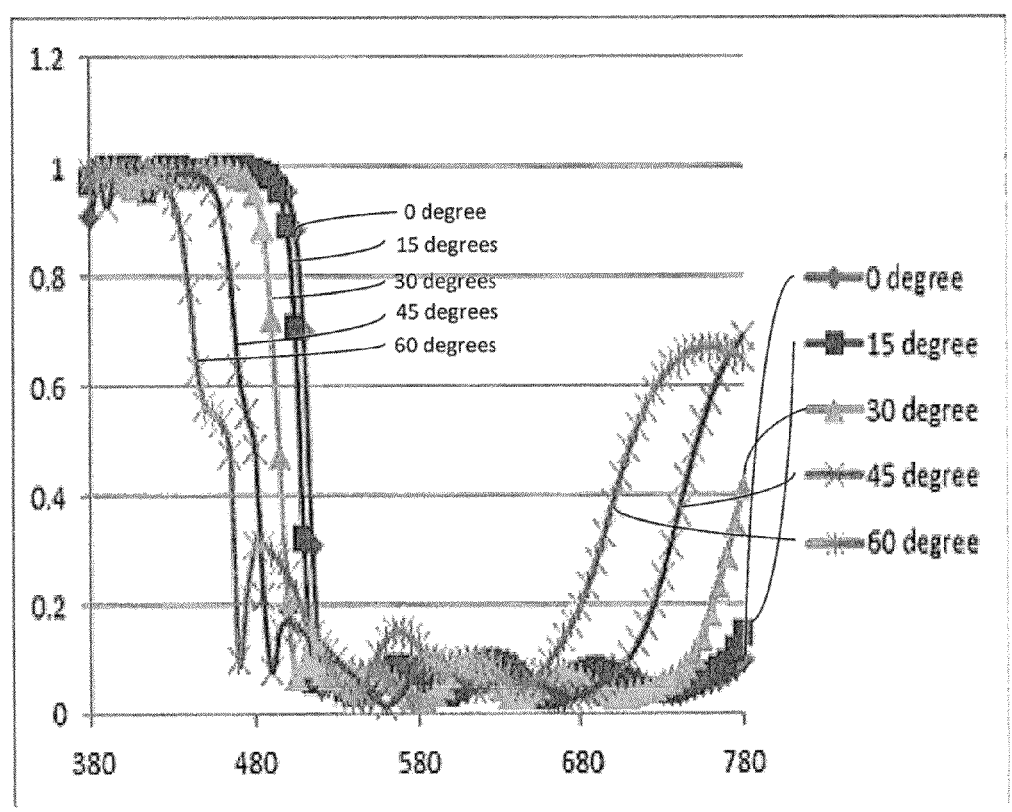
FIG. 11 illustrates transmittance of a dichroic filter and its angular dependence.

The dichroic filter shown in FIG. 8 tends to exhibit angular dependence in its cut-off wavelength, as illustrated in FIG. 11. As illustrated, the cut-off wavelength tends to shift from generally 525 nm at 0 degrees incidence angle to generally 450 nm at 60 degrees incidence angle. Accordingly, the blue light from the light emitting diode leaks through the dichroic filter at large incidence angles, thus reducing the yellow phosphor light, and changing the purity of the resulting color from the display. To improve the efficiency of the dichroic filter and also reduce the blue leakage light, the angular incidence of the blue light on the dichroic filter should be reduced or otherwise controlled.

Figure 12:
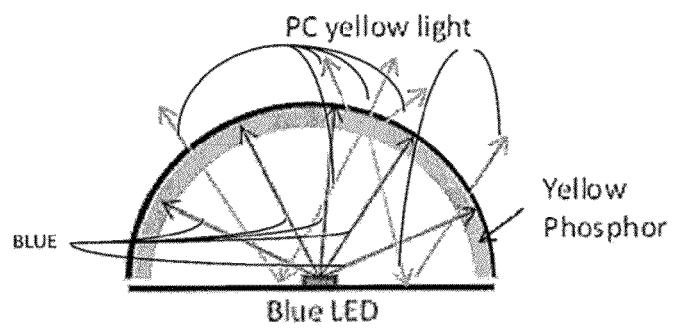
FIG. 12 illustrates a convex shaped dichroic filter.

Referring to FIG. 12, one technique to control the angular incidence of the blue light on the dichroic filter may be achieved by using a convex shaped dichroic filter. The convex shaped dichroic filter reflects all the unconverted blue light back to the phosphor layer which improves the phosphor conversion process. Other shaped dichroic filters and/or light guides may likewise be used to control the angular incidence of the blue light on the dichroic filter.

Figure 13:
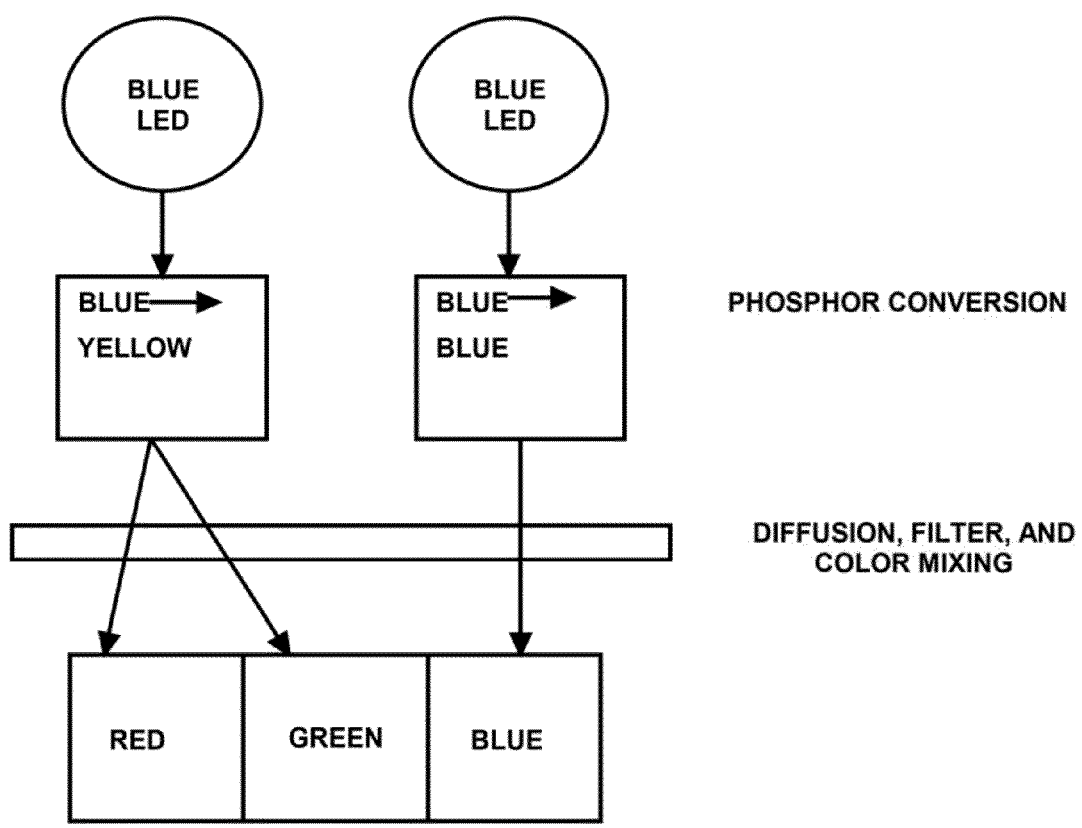
FIG. 13 illustrates a tri-color display structure with phosphor conversions.

Referring to FIG. 13 for example, the broad band yellow phosphor may be used to generate a yellow backlight for red and green for a red, green, blue based display (e.g., a multi-colored display). The blue light may be passed either directly, or indirectly, as the blue portion of the backlight for the display. In many cases, a red color filter may be used to provide an improved red color, a green color filter may be used to provide an improved green color, and/or a blue color filter may be used to provide an improved blue color, to reduce the effects of unintentionally mixing colors. Also, a diffusion layer may be included, if desired. Other colors and arrangements may likewise be used.

Figure 14:
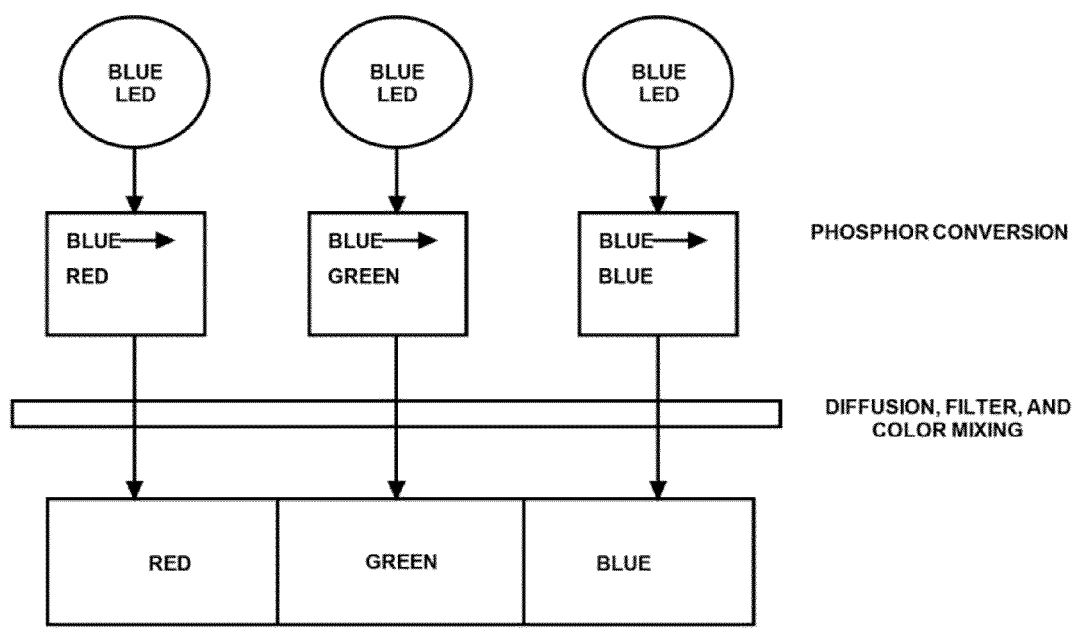
FIG. 14 illustrates a tri-color display structure with phosphor conversions.

Referring to FIG. 14 for example, a broad band red phosphor and a broad band green phosphor may be used to generate a respective backlight for red and green for a red, green, blue based display (e.g., a multi-colored display). The blue light may be passed either directly, or indirectly, as the blue portion of the backlight for the display. In many cases, a red color filter may be used to provide an improved red color, a green color filter may be used to provide an improved green color, and/or a blue color filter may be used to provide an improved blue color, to reduce the effects of unintentionally mixing colors. Also, a diffusion layer may be included, if desired. Narrow spectra band phosphors may be used, such as nano phosphors, if desired. Other colors and arrangements may likewise be used.

An exemplary analysis based on a three color LCD display with dual color backlight, (1) blue and (2) blue+broad band yellow phosphor is illustrated.

The display image as a function of wavelength ($\lambda$) may be given by $$img(x,y,\lambda) = bl(x,y,\lambda) LCD(x,y,\lambda)$$

$$bl(x,y,\lambda) = (LED_b(i,j,\lambda) + LED_y(i,j,\lambda)) * psf(x,y)$$

where $$T_{LCD}(x,y,\lambda) = LCD_r(x,y,\lambda) + LCD_g(x,y,\lambda) + LCD_b(x,y,\lambda).$$

The products of the dual LED backlight and RGBY LCD array form six distinct spectra: three primary spectra and three secondary spectra. By selecting appropriate color filters and phosphors, the secondary spectra can be substantially reduced, and thus effectively ignored.

Figure 15:
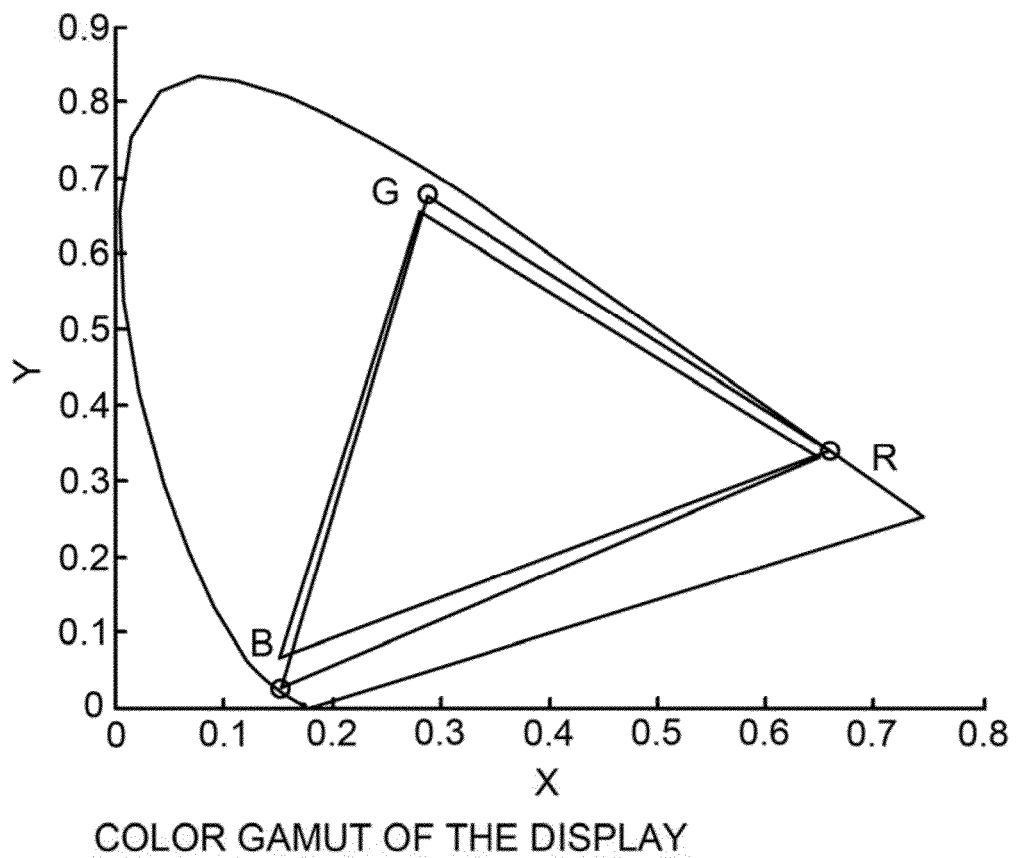
FIG. 15 illustrates a color gamut of the display.

FIG. 15 illustrates the resulting color gamut of the display. With the blue and yellow dual color backlight, all three primaries shift toward a respective spectral locus, which results in large color gamut. For example, when a blue light is displayed, the yellow backlight can be off, thus reducing LCD leakage due to the limited contrast ratio and also reduces the power consumption.

For example, the three primaries maybe modeled as $$\begin{pmatrix} R \\ G \\ B \end{pmatrix} = \begin{bmatrix} bl_y & 0 & 0 \\ 0 & bl_y & 0 \\ 0 & 0 & bl_b \end{bmatrix} \begin{bmatrix} LCD_r \\ LCD_g \\ LCD_b \end{bmatrix},$$

where both the LED and LCD voltages may be independently modulated. Since the LED array is at lower resolution, the LED intensity values in the above equation may be given by the convolution of LED driving signal and the point spread function (PSF) of LED.

Figure 16:
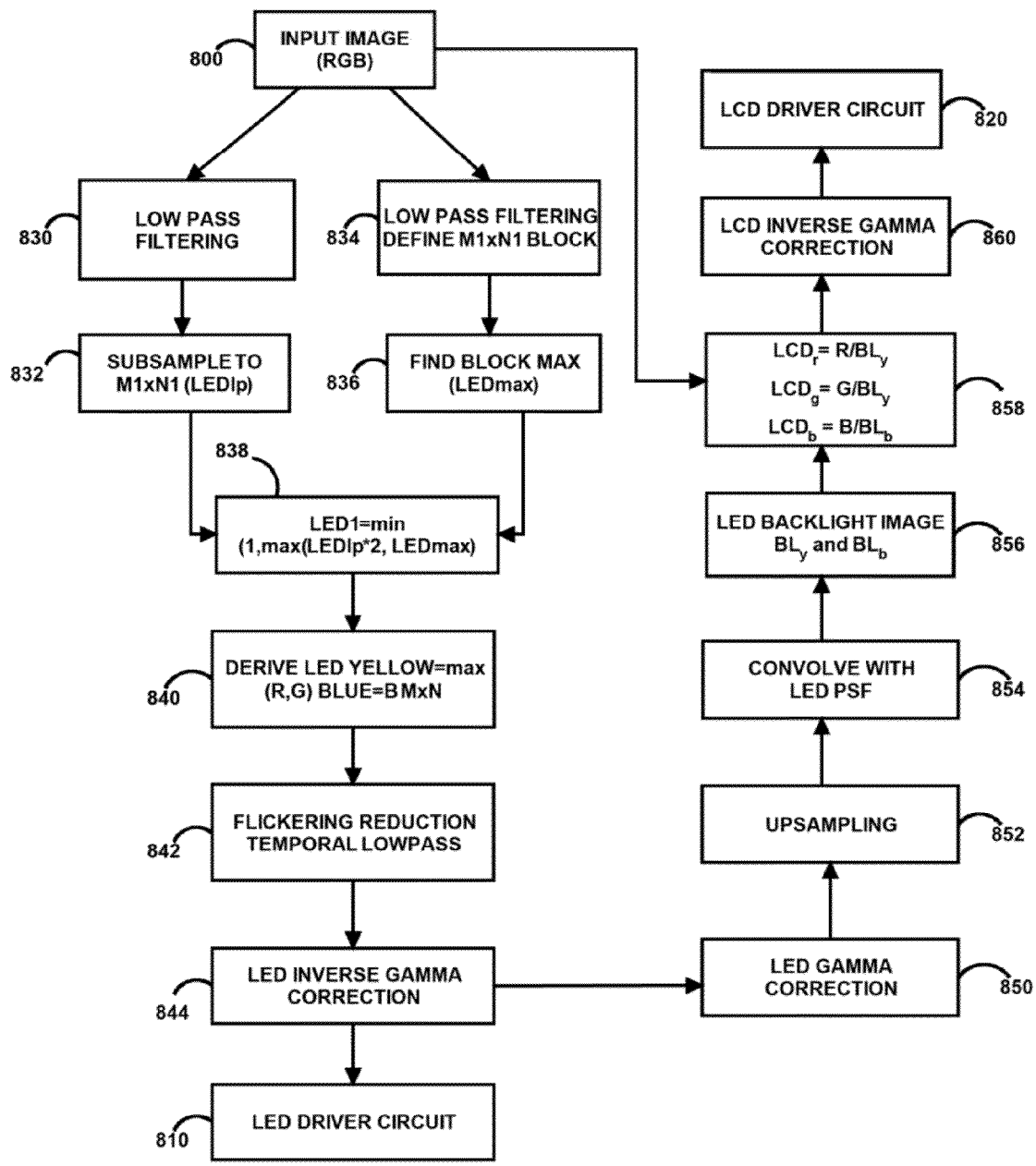
FIG. 16 illustrates a technique of deriving LED and LCD driving values for a display.

FIG. 16 illustrates a technique to convert an input image 800 into a low resolution LED backlight image 810 and a high resolution LCD image 820. The LCD image resolution is m×n pixels, each pixel having a value ranging from 0 to 1, with 0 being black and 1 being the maximum transmittance. The LED image resolution is M×N with M<m and N<n. The system may assume that the input image has the same resolution as the LCD image. If the input image is of different resolution, a scaling or cropping step may be used to convert the input image to the LCD image resolution.

The input image 800 may be low pass filtered 830 by the point spread function of the diffusion screen and sub-sampled 832 (down sample) to an intermediate resolution (M1×N1). For example, M1×N1 may be twice the LED image resolution (2M×2N). The extra resolution of the LCD image relative to the LED image assists in reducing flickering for moving objects. The input image 800 may be low pass filtered 834 by a smaller filter kernel, such as 5×5 to simulate the size of specular pattern. The low pass filtered 834 image is then divided into M1×N1 blocks, each block corresponding to one LED with some overlap between each block. The block size is (1+k)*(m/M×n/N), where k is the overlapping factor. For each block, the block maximum is used to form a LEDmax image (M×N) 836. Preferably k is 0.25.

Based upon the two LED images 832, 836, the system selects the larger of 2*LEDlp and LEDmax, i.e. LED1=min (max(LEDlp*2,LEDmax), 1) 838. The min operation constrains the LED value from 0 to 1. A 1D or 2D lookup table (LUT) may be used to determine the LED driving value from the LEDlp and LEDmax, which provides more flexibility in a tradeoff between power savings and specular highlight preservation. Since the red and green may share the same yellow LEDs, the yellow LED signal is preferably selected to be the max of red and green LED signal 840. A flickering reduction and/or temporal lowpass filtering process 842 may be used. The filtered image 842 may be LED inverse gamma corrected 844, and provided to the LED driver circuit 810.

The LED inverse gamma correction 844 may be provided to a LED gamma correction 850. The sub-sampled gamma corrected data may be upsampled 852, preferably to the LCD image resolution. The LED1 838 is of size M1×N1 and ranges from 0 to 1. Since the PSF of the diffusion screen is typically larger than the LED spacing to provide a more uniform backlight image, there tends to be considerable crosstalk between the LED elements that are located close together. The backlight $bl_y(x,y)$ and $bl_b(x,y)$ 856, can be predicted by convolving the LED driving signal with the PSF 854. The LCD driving value 858 may be derived by dividing the input image by the respective backlights 856. The LCD driving values 858 may be inverse gamma corrected 860 and provided to the LCD driver circuit 820.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method of illuminating a display comprising the steps of:
    (a) spatially varying the luminance of a light source, said light source including a plurality of lighting elements each having the same spectrum of light, and said light source illuminating a plurality of pixels of said display in response to receiving a plurality of pixel values;
    (b) varying the transmittance of a light valve of said display, said display including a plurality of different dichroic filters corresponding to different ones of said lighting elements having said same spectrum of light in response to receiving said plurality of pixel values;
    (c) modifying the illumination from said display for said plurality of pixel values based upon modification of said luminance of said light source and said varying said transmittance of said light valve, wherein light from a first said lighting element passes through a first corresponding said dichroic filter, wherein light from a second said lighting element passes through a second corresponding said dichroic filter, wherein light from a third said lighting element passes through a third corresponding said dichroic filter, wherein said first, second, and third dichroic filters each transmit different spectrums of light, wherein said display illuminates said plurality of pixels at least three of which having a different color and corresponding to said first, second, and third dichroic filters;
    (d) wherein said modifying is further based upon modification of a first said lighting element of said light source together with modification of the transmittance of said light valve corresponding to at least one of said dichroic filters of a different color than said first lighting element in such a manner that generally blue light from said first lighting element is converted to a generally second light from said display, using said at least one of said dichroic filters, and in a manner that increases the color gamut of said display, wherein at least one of said dichroic filters of said different color and said first lighting element includes a structure to limit the angular incidence of said generally blue light from said first lighting element upon said at least one of said dichroic filters of said different color; and
    (e) wherein one of said dichroic filters receives said generally blue light from said first lighting element and reflects said blue light to said first lighting element to be converted to generally yellow light.

2. The method of claim 1 wherein said structure of one of said dichroic filters is curved.

3. The method of claim 2 wherein said one of said dichroic filters has an inner coating of a phosphor.

4. The method of claim 3 wherein said one of said dichroic filters is convex shaped.

5. A method of illuminating a display comprising the steps of:
    (a) spatially varying the luminance of a light source, said light source including a plurality of lighting elements each having the same spectrum of light, and said light source illuminating a plurality of pixels of said display in response to receiving a plurality of pixel values;
    (b) varying the transmittance of a light valve of said display, said display including a plurality of different dichroic filters corresponding to different ones of said lighting elements having said same spectrum of light in response to receiving said plurality of pixel values;
    (c) modifying the illumination from said display for said plurality of pixel values based upon modification of said luminance of said light source and said varying said transmittance of said light valve, wherein light from a first said lighting element passes through a first corresponding said dichroic filter, wherein light from a second said lighting element passes through a second corresponding said dichroic filter, wherein light from a third said lighting element passes through a third corresponding said dichroic filter, wherein said first, second, and third dichroic filters each transmit different spectrums of light, wherein said display illuminates said plurality of pixels at least three of which having a different color and corresponding to said first, second, and third dichroic filters;
    (d) wherein said modifying is further based upon modification of a first said lighting element of said light source together with modification of the transmittance of said light valve corresponding to at least one of said dichroic filters of a different color than said first lighting element in such a manner that generally blue light from said first lighting element is converted to a generally second light from said display, using said at least one of said dichroic filters, and in a manner that increases the color gamut of said display, wherein at least one of said dichroic filters of said different color includes a curved structure with an inner coating of a phosphor, to limit the angular incidence of said generally blue light from said first lighting element upon said at least one of said dichroic filters of said different color.

6. The method of claim 5 wherein one of said dichroic filters receives said generally blue light from said first lighting element and reflects said blue light to said first lighting element to be converted to generally yellow light.

7. The method of claim 6 wherein said one of said dichroic filters is convex shaped.

* * * * *